United States Patent
Wang et al.

(10) Patent No.: US 11,354,499 B2
(45) Date of Patent: Jun. 7, 2022

(54) META-KNOWLEDGE FINE TUNING METHOD AND PLATFORM FOR MULTI-TASK LANGUAGE MODEL

(71) Applicant: ZHEJIANG LAB, Hangzhou (CN)

(72) Inventors: Hongsheng Wang, Hangzhou (CN); Haijun Shan, Hangzhou (CN); Shengjian Hu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 17/531,813

(22) Filed: Nov. 22, 2021

(65) Prior Publication Data

US 2022/0138414 A1   May 5, 2022

Related U.S. Application Data

(63) Continuation of application No. PCT/CN2020/138014, filed on Dec. 21, 2020.

(30) Foreign Application Priority Data

Nov. 2, 2020   (CN) .......................... 202011202867.7

(51) Int. Cl.
  *G06F 40/20*    (2020.01)
  *G06K 9/62*    (2022.01)
  (Continued)

(52) U.S. Cl.
  CPC ........... *G06F 40/20* (2020.01); *G06K 9/6215* (2013.01); *G06N 5/022* (2013.01); *G06N 5/04* (2013.01); *G06N 20/00* (2019.01)

(58) Field of Classification Search
  CPC ...... G06F 40/20; G06K 9/6215; G06N 5/022; G06N 5/04; G06N 20/00
  See application file for complete search history.

(56) References Cited

U.S. PATENT DOCUMENTS 9,367,526 B1 *  6/2016  Vozila ..................... G06F 40/30
10,607,598 B1   3/2020  Larson et al.
(Continued)

FOREIGN PATENT DOCUMENTS

CN    107767954 A    3/2018
CN    108830287 A    11/2018
(Continued)

OTHER PUBLICATIONS

International Search Report (PCT/CN2020/138014); dated Jul. 30, 2021.
(Continued)

*Primary Examiner* — Akwasi M Sarpong
(74) *Attorney, Agent, or Firm* — W&G Law Group

(57) ABSTRACT

Disclosed is a meta-knowledge fine tuning method and platform for a multi-task language model. The method is to obtain highly transferable shared knowledge, that is, meta-knowledge, on different data sets of tasks of the same category, perform interrelation and mutual reinforcement on the learning processes of the tasks of the same category that correspond to different data sets and are in different domains, so as to improve the fine tuning effect of downstream tasks of the same category on data sets of different domains in the application of the language model, and improve the parameter initialization ability and the generalization ability of a general language model for the tasks of the same category.

4 Claims, 1 Drawing Sheet

(51) Int. Cl.
*G06N 20/00* (2019.01)
*G06N 5/04* (2006.01)
*G06N 5/02* (2006.01)

(56) References Cited

U.S. PATENT DOCUMENTS

| | | | | |
|---|---|---|---|---|
| 11,120,839 | B1* | 9/2021 | Siagian | G11B 27/32 |
| 2013/0158982 | A1* | 6/2013 | Zechner | G09B 19/06 |
| | | | | 704/9 |
| 2015/0278192 | A1* | 10/2015 | Bretter | G10L 15/00 |
| | | | | 704/9 |
| 2015/0324338 | A1* | 11/2015 | Levy | G06F 40/143 |
| | | | | 715/244 |
| 2016/0062985 | A1* | 3/2016 | Epstein | G06F 40/216 |
| | | | | 704/9 |
| 2016/0371543 | A1* | 12/2016 | Smirnov | G06V 30/413 |
| 2017/0236034 | A1* | 8/2017 | Dolev | G06Q 20/042 |
| | | | | 705/44 |
| 2020/0210648 | A1* | 7/2020 | Comeau | G06F 16/3331 |
| 2020/0320982 | A1* | 10/2020 | Larson | G10L 15/07 |
| 2020/0401929 | A1* | 12/2020 | Duerig | G06N 3/084 |
| 2021/0142164 | A1* | 5/2021 | Liu | G06F 40/30 |
| 2021/0142181 | A1* | 5/2021 | Liu | G06N 3/08 |

FOREIGN PATENT DOCUMENTS

| | | |
|---|---|---|
| CN | 110909145 A | 3/2020 |
| CN | 111291166 A | 6/2020 |
| CN | 111310848 A | 6/2020 |
| CN | 111814448 A | 10/2020 |
| CN | 111832282 A | 10/2020 |
| CN | 112100383 A | 12/2020 |

OTHER PUBLICATIONS

CN First Office Action(202011202867.7); dated Dec. 29, 2020.
Deep Learning-Fine-tuning Models: Use the Tensorflow Slim Fine-tune model; dated Aug. 1, 2018.
Google BERT model fine-tune Ultimate practice tutorial(machine translation); dated Nov. 26, 2018.

* cited by examiner

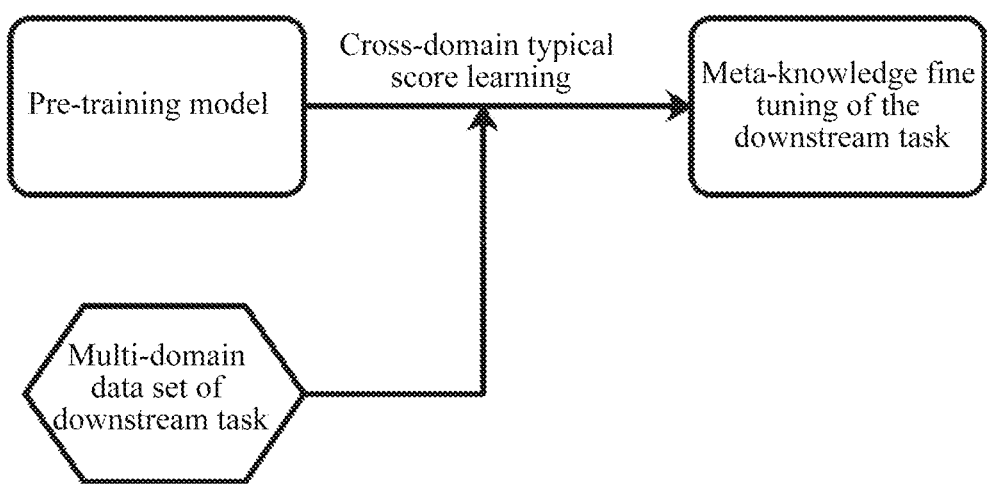

META-KNOWLEDGE FINE TUNING METHOD AND PLATFORM FOR MULTI-TASK LANGUAGE MODEL

CROSS-REFERENCE TO RELATED APPLICATIONS

The present application is a continuation of International Application No. PCT/CN2020/138014, filed on Dec. 21, 2020, which claims priority to Chinese Application No. 202011202867.7, filed on November 2, the contents of both of which are incorporated herein by reference in their entireties.

TECHNICAL FIELD

The present disclosure belongs to the field of language model compression, and in particular relates to a meta-knowledge fine tuning method and platform for a multi-task language model.

BACKGROUND

The automatic compression technology of large-scale pre-training language models has achieved significant effects in the application fields of natural language understanding and generation tasks; however, when facing downstream tasks in the smart city field, it is a key step of improving the model compression effect to perform fine tuning on large models again on the basis of a specific data set, the existing fine tuning method for downstream task language models is to perform fine tuning on the specific data set of the downstream task, and the effect of a compression model obtained by training is limited to the specific data set of this category of tasks.

SUMMARY

The purpose of the present disclosure is to provide a meta-knowledge fine tuning method and platform for a multi-task language model in view of the shortcomings of the prior art. The present disclosure proposes typical score learning based on cross-domain. The method is used for obtaining highly transferable shared knowledge on different data sets of tasks of the same category, "meta-knowledge" is introduced to perform interrelation and mutual reinforcement on the learning processes of the tasks of the same category that correspond to different data sets and are in different domains, so as to improve the fine tuning effect of the downstream tasks of the same category on data sets of different domains in the language model application of the smart city field, and improve the parameter initialization ability and the generalization ability of a general language model for the tasks of the same category.

The purpose of the present disclosure is achieved through the following technical solution: a meta-knowledge fine tuning method for a multi-task language model, including the following stages:

a first stage, calculating the prototypes of cross-domain data sets of tasks of the same category: embedded features of the prototypes of the corresponding domains of the tasks of this category is intensively learned from the data sets of different domains of the tasks of the same category, and the average embedded feature of all input texts of the tasks of the same category in different domains is taken as a corresponding multi-domain category prototype of the tasks of the same category;

a second stage, calculating typical scores of instances: $d_{self}$ represents the distance between the embedded feature of each instance and $d_{others}$ represents the distance between the embedded feature of each instance and other domain prototypes, and the typical score of each instance is defined as a linear combination of $d_{self}$ and $d_{others}$; and a third stage, a meta-knowledge fine tuning network based on typical scores: the typical scores obtained in the second stage is used as weight coefficients of the meta-knowledge fine tuning network, and a multi-task typical sensitive label classification loss function is designed as a learning objective function of meta-knowledge fine tuning; and the loss function penalizes the labels of the instances of all domains that a text classifier predicts incorrectly.

Further, in the first stage, a set of input texts $x_i^k$ with a category label m in the $k^{th}$ domain $D^k$ of the data set is expressed as $D_m^k$:

$$D_m^k = \{x_i^k | (x_i^k, y_i^k) \in D^k, y_i^k = m\}$$

where $m \in M$, M represents a set of all category labels in the data set; and $(x_i^k, y_i^k)$ represents the $i^{th}$ instance in the $k^{th}$ domain;

the category prototype $c_m^k$ represents the average embedded feature of all input texts with the category label m in the $k^{th}$ domain:

$$c_m^k = \frac{1}{D_m^k} \sum_{x_i^k \in D_m^k} \mathcal{E}(x_i^k)$$

where $\varepsilon(\cdot)$ represents an embedded expression of $x_i^k$ output by a BERT model; and for the BERT model, the average embedded feature is the average pooling of the last layer of Transformer encoder corresponding to the input $x_i^k$.

Further, in the second stage, the typical score $t_i^k$ of the instance $(x_i^k, y_i^k)$ is expressed as:

$$t_i^k = \alpha \frac{\sum_{m \in M} \beta_m \cos(\mathcal{E}(x_i^k), c_m^k)}{\sum_{m \in M} \beta_m} + \frac{1-\alpha}{K-1} \sum_{\tilde{k}=1}^{K} 1_{(\tilde{k} \neq k)} \frac{\sum_{m \in M} \beta_m \cos(\mathcal{E}(x_i^k), c_m^{\tilde{k}})}{\sum_{m \in M} \beta_m}$$

where $\alpha$ represents a predefined balance factor, and $0 < \alpha < 1$; $\cos(\cdot, \cdot)$ represents a cosine similarity measurement function; K represents the number of domains; $1_{(\tilde{k} \neq k)}$ represents an indication function, if $\tilde{k} \neq k$, 1 is returned, and if $\tilde{k} = k$, 0 is returned, the index $\tilde{k}$ is used for summation; and $\beta_m > 0$ represents the weight of $x_i^k$, and the weight of $x_i^k$ of the same category is the same.

Further, in the third stage, the multi-task typical sensitive label classification loss function $L_T$ is expressed as:

$$L_T = -\frac{1}{K} \sum_{(x_i^k, y_i^k) \in D} \sum_{m \in M} 1_{(y_i^k = m)} t_i^k \cdot \log \tau_m(f(x_i^k))$$

where D represents a set of all domains; $1_{(y_i^k = m)}$ represents an indication function, if $y_i^k = m$, 1 is returned, and if $y_i^k \neq m$, 0 is returned; $\tau_m(f(x_i^k))$ represents the probability that the category label $x_i^k$ is predicted as m; and $f(x_i^k)$ represents an embedded layer feature of the token of "[CLS]" output by the last layer of the BERT model.

A meta-knowledge fine tuning platform for a multi-task language model includes the following components:

a data loading component configured to obtain a training sample of a multi-task-oriented pre-training language model, wherein the training sample is a labeled text sample that satisfies a supervised learning task;

an automatic compression component configured to automatically compress the multi-task-oriented pre-training language model, and including a pre-training language model and a meta-knowledge fine tuning module, wherein the meta-knowledge fine tuning module is used for constructing a downstream task network on the pre-training language model generated by the automatic compression component, performing fine tuning on a downstream task scenario by using the meta-knowledge of a typical score, outputting a final fine-tuned student model, that is, a compression model of the pre-training language model that is required by a logged-in user and includes a downstream task; outputting the compression model to a designated container for the logged-in user to download, and presenting the comparison information of model size before and after the compression; and an inference component: the logged-in user obtains the compression model of the pre-training language model from the platform, and the user uses the compression model output by the automatic compression component to infer the new data of a natural language processing downstream task uploaded by the logged-in user on the data set of the actual scenario, and presents the comparison information of the inference speed before and after the compression.

The beneficial effects of the present disclosure are as follows:

(1) the present disclosure studies the meta-knowledge fine tuning method for the multi-task language model on the basis of cross-domain typical score learning, the fine tuning method of the pre-training language model oriented to the downstream task is to perform fine tuning on the cross-domain data set of the downstream task, the effect of the compression model obtained by fine tuning is not limited to the specific data set of the tasks of this category, on the basis of the pre-training language model, the downstream task is fine-tuned through the meta-knowledge fine tuning network, so as to obtain the language model of the downstream tasks of the same category that is independent of the data set;

(2) the present disclosure proposes to learn the highly transferable shared knowledge on different data sets of the tasks of the same category, that is, meta-knowledge; the meta-knowledge is introduced, the meta-knowledge fine tuning network performs interrelation and mutual reinforcement on the learning processes of the tasks of the same category that correspond to different data sets and are in different domains, so as to improve the fine tuning effect of the downstream tasks of the same category on the data sets of different domains in the language model application of the smart city field, and improve the parameter initialization ability and the generalization ability of a general language model for the tasks of the same category, and finally, the language model for the downstream tasks of the same category is obtained; and (3) the meta-knowledge fine tuning platform for the multi-task language model of the present disclosure generates a general architecture for the language model of the tasks of the same category, makes full use of the fine-tuned model architecture to improve the compression efficiency of the downstream tasks of the same category, and can deploy a large-scale natural language processing model in end-side devices with small memories and limited resources, thereby promoting the implementation of a general deep language model in the industry.

BRIEF DESCRIPTION OF DRAWINGS

FIG. 1 is an overall architecture diagram of a meta-knowledge fine tuning method of the present disclosure.

DESCRIPTION OF EMBODIMENTS

As shown in FIG. 1, according to a meta-knowledge fine tuning method and platform for a multi-task language model of the present disclosure, on a multi-domain data set of a downstream task of a pre-training language model, on the basis of cross-domain typical score learning, a downstream task scenario is fine-tuned by using the meta-knowledge of a typical score, so that a meta-learner can easily fine tune to any domain, the learned knowledge has a high degree of generalization and transferability, rather than being limited to a specific domain, and the effect of the obtained compression model is suitable for data scenarios in different domains of tasks of the same category.

A meta-knowledge fine tuning method for a multi-task language model of the present disclosure includes the following steps:

step 1: calculating the prototypes of cross-domain data sets of tasks of the same category: considering that multi-domain prototypes can summarize the key semantic features of corresponding training data sets, therefore, intensively learning embedded features of the prototypes of the corresponding domains of the tasks of this category from the data sets of different domains, and generating a multi-domain category prototype of the tasks of the same category, specifically, for a BERT language model, taking the average embedded feature of all input texts of the tasks of the same category in different domains as a category prototype corresponding to the tasks of this category, wherein the average embedded feature is the output of an average pooling layer of the last layer of Transformer encoder corresponding to a current input instance.

Step (1.1): defining the cross-domain data set. A category set of input instances is defined as M, and the set of instances of all input text $x_i^k$ of the $m^{th}$ category of labels in the $k^{th}$ domain is defined as $D_m^k = \{x_i^k | (x_i^k, y_i^k) \in D^k, y_i^k = m\}$, wherein m ε M.

Step (1.2): defining the category prototype. The average embedded feature of all input texts in the $k^{th}$ domain $D^k$ is taken as the category prototype corresponding to the domain.

Step (1.3): calculating the category prototype. The category prototype $c_m^k$ is the average pooling of the last layer of Transformer encoder corresponding to $x_i^k$ that is input into the BERT model, and the calculation is as follows:

$$c_m^k = \frac{1}{D_m^k} \sum_{x_i^k \in D_m^k} \mathcal{E}(x_i^k)$$

wherein, ε(·) represents mapping $x_i^k$ to the embedded feature of the d dimension.

Step 2: calculating a typical score of a training instance: considering that if the training instance is semantically close to the category prototype of its own domain, and is not too far away from the category prototypes generated by other domains, it is considered that the instance is typical and has very high portability. The semantics of the training instance must include an associated feature of its own domain as well as the associated feature with other domains, and a typical training instance is defined as a linear combination of the above two associated features. Specifically, the distance between the embedded feature of each training instance and its own domain prototype is expressed as $d_{self}$, the distance between the embedded feature of each training instance and other domain prototypes is expressed as $d_{others}$, and the typical score of each training instance is expressed as a linear combination of $d_{self}$ and $d_{others}$.

Since one prototype may not be enough to represent the complex semantic information of a certain category, the above single category prototype is further expanded to generate a category prototype of a certain category that is generated on the basis of clustering of multiple prototypes. Specifically, for example, in a polarity classification problem of natural language emotion, that is, judging the emotion polarity of a certain sentence, the possible polarity includes positive (positive), negative (negative), neutral (neutral), and conflict (conflict), in a polarity classification task oriented to all emotions, for the calculation method of the category prototype of the positive category, a general category prototype corresponding to the category can be generated by performing clustering on multiple different data sets.

Step (2.1): calculating the associated feature between the training instance and its own domain. The associated feature between each training instance and its own domain is a cosine similarity measurement distance between each training instance ($x_i^k$, $y_i^k$) and its own domain prototype $c_m^k$, that is, $\cos(\mathcal{E}(x_i^k), c_m^k)$.

Step (2.2): calculating the associated feature between the training instance and other domains. The associated feature between each training instance and the other domains is the cosine similarity measurement distance between each training instance ($x_i^k$, $y_i^k$) and the category prototype generated by the other domains, that is, $$\frac{1}{K-1} \cdot \sum_{\tilde{k}=1}^{K} = 1_{(\tilde{k} \neq k)} \cos(\mathcal{E}(x_i^k), c_m^{\tilde{k}}).$$

Step (2.3): calculating a feature score of the typical training instance. The feature score of the typical training instance ($x_i^k$, $y_i^k$) is:

$$t_i^k = \alpha \cos(\mathcal{E}(x_i^k), c_m^k) + \frac{1-\alpha}{K-1} \cdot \sum_{\tilde{k}=1}^{K} 1_{(\tilde{k} \neq k)} \cos(\mathcal{E}(x_i^k), c_m^{\tilde{k}})$$

wherein, $\alpha$ represents a predefined balance factor, and $0 < \alpha < 1$; $\cos(\cdot,\cdot)$ represents a cosine similarity measurement function; $1_{(\cdot)}$ represents an indication function, if an input boolean function is true, 1 is returned, or otherwise, 0 is returned.

Step (2.4): calculating the feature score of the typical training instance on the basis of multiple prototypes. Considering that one prototype may not be enough to represent the complex semantic information of a certain category, multiple prototypes are generated through clustering, and the category prototype of this category is calculated on the basis of the multiple prototypes of the same category. Therefore, the feature score $t_i^k$ of the instance ($x_i^k$, $y_i^k$) is expanded to:

$$t_i^k = \alpha \frac{\sum_{m \in M} \beta_m \cos(\mathcal{E}(x_i^k), c_m^k)}{\sum_{m \in M} \beta_m} + \frac{1-\alpha}{K-1} \cdot \sum_{\tilde{k}=1}^{K} \frac{1_{(\tilde{k} \neq k)} \sum_{m \in M} \beta_m \cos(\mathcal{E}(x_i^k), c_m^{\tilde{k}})}{\sum_{m \in M} \beta_m}$$

wherein, $\beta_m > 0$ represents the weight of a clustering member of the instance $x_i^k$, and each category label $m \in M$.

Step 3: a meta-knowledge fine tuning network based on typical scores: next, how to design a learning objective function of meta-knowledge fine tuning will be studied according to the typical feature score calculated above. The present disclosure proposes to design a multi-task typical sensitive label classification loss function on the basis of the features of a cross-domain typical instance. This loss function penalizes the labels of the typical instances of all K domains that a text classifier predicts incorrectly. Specifically, the typical score obtained in the second stage is used as a weight coefficient of the meta-knowledge fine tuning network. The learning objective function of the meta-knowledge fine tuning network is defined as:

$$L_T = -\frac{1}{K} \sum_{(x_i^k, y_i^k) \in D} \sum_{m \in M} 1_{(y_i^k = m)} t_i^k \cdot \log \tau_m(f(x_i^k))$$

wherein, $L_T$ represents the multi-task typical sensitive label classification loss function, and the loss function penalizes the labels of the typical instances of all K domains that the text classifier predicts incorrectly. $t_i^k$ represents the weight of each training instance. $\tau_m(f(x_i^k))$ represents the probability that the category label of the instance $x_i^k$ is predicted as m, and the embedded layer of the token of the d-mensional "[CLS]" of the last layer of the BERT model is taken as the feature and is expressed as $f(x_i^k)$.

A meta-knowledge fine tuning platform for a multi-task language model of the present disclosure includes the following components:

a data loading component configured to obtain a training sample of a multi-task-oriented pre-training language model, wherein the training sample is a labeled text sample that satisfies a supervised learning task;

an automatic compression component configured to automatically compress the multi-task-oriented pre-training language model, and including a pre-training language model and a meta-knowledge fine tuning module.

The meta-knowledge fine tuning module is used for constructing a downstream task network on the pre-training language model generated by the automatic compression component, performing fine tuning on a downstream task scenario by using the meta-knowledge of a typical score, outputting a final fine-tuned student model, that is, a compression model of the pre-training language model that is required by a logged-in user and includes a downstream task; and outputting the compression model to a designated container for the logged-in user to download, and presenting the comparison information of model size before and after the compression on a page of an output compression model of the platform.

An inference component: the logged-in user obtains the compression model of the pre-training language model from the platform, and the user uses the compression model output by the automatic compression component to infer the new data of a natural language processing downstream task uploaded by the logged-in user on the data set of the actual scenario, and presents the comparison information of the inference speed before and after the compression on an inference page of the compression model of the platform.

The technical solution of the present disclosure will be further described in detail below with the natural language inference task in the application scenarios of intelligent question and answer, intelligent customer service, and multi-round dialogue.

The natural language inference task is to give a pair of sentences and judge whether the semantics of the two sentences are similar, contradictory or neutral. Since it is also a classification problem, it is also called a sentence pair classification problem. An MNLI data set provides training instances from multiple fields, so as to infer whether the two sentences have similar, contradictory or irrelevant meanings. The BERT model and the MNLI data set of the natural language inference task uploaded by the logged-in user are obtained through the data loading component of the platform; a multi-task-oriented BERT pre-training language model is generated by means of the automatic compression component of the platform; the BERT pre-training model generated by the automatic compression component is loaded via the platform, and a model of the natural language inference task model is constructed on the generated pre-training model; fine tuning is performed on the basis of the student model obtained by the meta-knowledge fine tuning module of the automatic compression component, a downstream task network is constructed on the basis of the pre-training language model, the downstream task scenario is fine-tuned by using the meta-knowledge of the typical score, so as to output the final fine-tuned student model, that is, the compression model of the pre-training language model that is required by the logged-in user and includes the natural language inference task; and the compression model is output to the designated container for the logged-in user to download, and 5%, 10%, and 20% of the data of each field are randomly sampled from the training data for meta-knowledge fine tuning. Moreover, the comparison information of model accuracy before and after fine tuning is presented on the page of the output compression model of the platform, as shown in Table 1 below.

Table 1: Comparison information of a BERT model of the natural language inference task before and after meta-knowledge fine tuning

| Method | Animal | Plant | Vehicle | Average |
|---|---|---|---|---|
| Before meta-knowledge fine tuning | 93.6% | 91.8% | 84.2% | 89.3% |
| After meta-knowledge fine tuning | 94.5% | 92.3% | 90.2% | 92.3% |

It can be seen from Table 1 that, through the inference component of the platform, the compression model output by the platform is used for inferring the MNLI test set data uploaded by the logged-in user, and it is presented on the inference page of the compression model of the platform that the inference accuracy after meta-knowledge fine tuning is respectively increased by 0.9%, 0.5% and 6.0% in the animal, plant and vehicle fields compared with that before meta-knowledge fine tuning.

What is claimed is:

1. A meta-knowledge fine tuning method for a multi-task language model, comprising the following stages:

a first stage, calculating the prototypes of cross-domain data sets of tasks of the same category: embedded features of the prototypes of the corresponding domains of the tasks of the category is intensively learned from the data sets of different domains of the tasks of the same category, and the average embedded feature of all input texts of the tasks of the same category in different domains is taken as a corresponding multi-domain category prototype of the tasks of the same category;

a second stage, calculating typical scores of instances: where $d_{self}$ represents the distance between the embedded feature of each instance and $d_{others}$ represents the distance between the embedded feature of each instance and other domain prototypes; and the typical score of each instance is defined as a linear combination of $d_{self}$ and $d_{others}$;

and a third stage, a meta-knowledge fine tuning network based on typical scores: the typical scores obtained in the second stage is used as weight coefficients of the meta-knowledge fine tuning network, and a multi-task typical sensitive label classification loss function is designed as a learning objective function of meta-knowledge fine tuning; and the loss function penalizes the labels of the instances of all domains that the language model predicts incorrectly;

wherein in the first stage, $D_m^k$ represents a set of input texts $x_i^k$ with a category label m in a $k^{th}$ domain $D^k$ of the data set:

$$D_m^k = \{x_i^k \vee (x_i^k, y_i^k) \in D^k, y_i^k = m\}$$

where $m \in M$, M represents a set of all category labels in the data set; and $(x_i^k, y_i^k)$ represents an $i^{th}$ instance in the $k^{th}$ domain;

the category prototype $c_m^k$ represents the average embedded feature of all input texts with the category label m in the $k^{th}$ domain:

$$c_m^k = \frac{1}{D_m^k} \sum_{x_i^k \in D_m^k} E(x_i^k)$$

wherein, $\varepsilon(\cdot)$ represents an embedded expression of $x_i^k$ output by a BERT model; and for the BERT model, the average embedded feature is the average pooling of the last layer of Transformer encoder corresponding to the input $x_i^k$.

2. The meta-knowledge fine tuning method for the multi-task language model according to claim 1, wherein in the second stage, the typical score $t_i^k$ of the instance $(x_i^k, y_i^k)$ is expressed as:

$$t_i^k = \alpha \frac{\sum_{m \in M} \beta_m \cos(E(x_i^k), c_m^k)}{\sum_{m \in M} \beta_m} + \frac{1-\alpha}{K-1} \cdot \sum_{\tilde{k}=1}^{K} 1_{(\tilde{k} \neq k)} \frac{\sum_{m \in M} \beta_m \cos(E(x_i^k), c_m^{\tilde{k}})}{\sum_{m \in M} \beta_m}$$

where $\alpha$ represents a predefined balance factor, and $0<\alpha<1$; $\cos(\cdot,\cdot)$ represents a cosine similarity measurement function; K represents the number of domains; $1_{(\tilde{k} \neq k)}$ represents an indication function, if $\tilde{k} \neq k$, 1 is returned, and if $\tilde{k}=k$, 0 is returned, the index $\tilde{k}$ is used for summation; and $\beta_m > 0$ represents a weight of $x_i^k$, and the weight of $x_i^k$ of the same category is the same.

3. The meta-knowledge fine tuning method for the multi-task language model according to claim 2, wherein in the third stage, the multi-task typical sensitive label classification loss function $L_T$ is expressed as:

$$L_T = -\frac{1}{K} \sum_{(x_i^k, y_i^k) \in D} \sum_{m \in M} 1_{(y_i^k = m)} t_i^k \cdot \log \tau_m(f(x_i^k))$$

where D represents a set of all domains; $1_{(y_i^k=m)}$ represents an indication function, if $y_i^k=m$, 1 is returned, and if $y_i^k \neq m$, 0 is returned; $\tau_m(f(x_i^k))$ represents the probability that the category label $x_i^k$ is predicted as m; and $f(x_i^k)$ represents an embedded layer feature of the token of "[CLS]" output by the last layer of the BERT model.

4. A meta-knowledge fine tuning method for a multi-task language model, comprising the following stages:
 a first stage, calculating the prototypes of cross-domain data sets of tasks of the same category: embedded features of the prototypes of the corresponding domains of the tasks of the category is intensively learned from the data sets of different domains of the tasks of the same category, and the average embedded feature of all input texts of the tasks of the same category in different domains is taken as a corresponding multi-domain category prototype of the tasks of the same category;
 a second stage, calculating typical scores of instances: where $d_{self}$ represents the distance between the embedded feature of each instance and $d_{dothers}$ represents the distance between the embedded feature of each instance and other domain prototypes; and the typical score of each instance is defined as a linear combination of $d_{self}$ and $d_{others}$; and
 a third stage, a meta-knowledge fine tuning network based on typical scores: the typical scores obtained in the second stage is used as weight coefficients of the meta-knowledge fine tuning network, and a multi-task typical sensitive label classification loss function is designed as a learning objective function of meta-knowledge fine tuning; and the loss function penalizes the labels of the instances of all domains that the language model predicts incorrectly a data loading component configured to obtain a training sample of a multi-task-oriented pre-training language model, wherein the training sample is a labeled text sample that satisfies a supervised learning task;

an automatic compression component configured to automatically compress the multi-task-oriented pre-training language model, comprising a pre-training language model and a meta-knowledge fine tuning module, wherein the meta-knowledge fine tuning module is used for constructing a downstream task network on the pre-training language model generated by the automatic compression component, performing fine tuning on a downstream task scenario by using the meta-knowledge of a typical score, outputting a final fine-tuned student model, that is, a compression model of the pre-training language model which is required by a logged-in user and comprises a downstream task; outputting the compression model to a designated container for the logged-in user to download, and presenting the comparison information of model size before and after the compression; and an inference component: the logged-in user obtains the compression model of the pre-training language model from the platform, and the user uses the compression model output by the automatic compression component to infer the new data of a natural language processing downstream task uploaded by the logged-in user on the data set of the actual scenario, and presents the comparison information of the inference speed before and after the compression.

* * * * *